United States Patent
Li et al.

(10) Patent No.: US 12,521,897 B2
(45) Date of Patent: Jan. 13, 2026

(54) HYBRID DRIVE OMNI-DIRECTIONAL MOTION ACTUATOR BASED ON ORIGAMI STRUCTURE

(71) Applicant: ZHEJIANG UNIVERSITY, Zhejiang (CN)

(72) Inventors: Jituo Li, Hangzhou (CN); Haipeng Zhang, Hangzhou (CN); Juncai Long, Hangzhou (CN); Guodong Lu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/079,509

(22) Filed: Mar. 14, 2025

(65) Prior Publication Data

US 2025/0205910 A1   Jun. 26, 2025

Related U.S. Application Data

(63) Continuation of application No. PCT/CN2024/073703, filed on Jan. 23, 2024.

(30) Foreign Application Priority Data

Dec. 22, 2023 (CN) .......................... 202311781123.9

(51) Int. Cl.
  B25J 17/00   (2006.01)
  B25J 17/02   (2006.01)

(52) U.S. Cl.
  CPC ................................. B25J 17/0283 (2013.01)

(58) Field of Classification Search
  CPC ........ B25J 9/08; B25J 17/0283; B25J 18/025; B25J 18/06
  See application file for complete search history.

(56) References Cited

U.S. PATENT DOCUMENTS 5,317,952 A * 6/1994 Immega ................. F15B 15/10
                                                     901/22
2015/0070904 A1   3/2015 Martinez et al.
(Continued)

FOREIGN PATENT DOCUMENTS

CN     110394795 A     11/2019
CN     113021410 A      6/2021
(Continued)

OTHER PUBLICATIONS

International Search Report (PCT/CN2024/073703); Date of Mailing: Aug. 10, 2024 (5 pages).

*Primary Examiner* — Zakaria Elahmadi
(74) *Attorney, Agent, or Firm* — Wiersch Law Group

(57) ABSTRACT

A hybrid drive omni-directional motion actuator based on an origami structure, comprising at least one actuating module. The actuating module comprises a columnar shell deforming based on the origami structure, an upper cover plate and a lower cover plate. The columnar shell is the origami structure derived from Waterbomb crease, and a cavity containing gas is formed inside the shell. The two ends of the cavity are open, and the openings are respectively connected with the upper cover plate and the lower cover plate for blocking the openings. The lower cover plate is provided with vent holes communicating with the cavity, and the upper cover plate and the lower cover plate are pulled by driving ropes arranged in a crossed manner. Through the cooperation of gas and tendon drive, the columnar shell can have deformations of contraction, bending and torsion, so that a single actuating module has omni-directional movement capability.

1 Claim, 4 Drawing Sheets

(56) References Cited

U.S. PATENT DOCUMENTS

| | | | | |
|---|---|---|---|---|
| 2023/0182285 A1* | 6/2023 | Zhang | .................. | B25J 9/08 |
| | | | | 74/490.01 |
| 2024/0084788 A1* | 3/2024 | Song | .................. | F03G 7/0612 |

FOREIGN PATENT DOCUMENTS

| | | | | | |
|---|---|---|---|---|---|
| CN | 113199464 | A | | 8/2021 | |
| CN | 113580120 | A | | 11/2021 | |
| CN | 116690533 | A | | 9/2023 | |
| CN | 116833979 | A | | 10/2023 | |
| CN | 117086853 | A | * | 11/2023 | ............ B25J 9/1085 |
| KR | 20230121390 | A | * | 8/2023 | ............ B25J 9/1045 |

* cited by examiner

HYBRID DRIVE OMNI-DIRECTIONAL MOTION ACTUATOR BASED ON ORIGAMI STRUCTURE

CROSS-REFERENCE TO RELATED APPLICATIONS

This application is a continuation of International Application No. PCT/CN2024/073703, filed on Jan. 23, 2024, which claims priority to Chinese Patent Application No. 202311781123.9, filed on Dec. 22, 2023. All of the aforementioned applications are hereby incorporated by reference in their entireties.

TECHNICAL FIELD

The present disclosure belongs to the field of robots, and in particular, to a hybrid drive omni-directional motion actuator based on an origami structure.

BACKGROUND

Motion actuator is a key component in the field of robot. Motion actuators made of soft materials have the advantages of human-computer interaction safety, and have become an important development direction of motion actuator. Among them, fluid-driven motion actuators achieve the motion by controlling the fluid volume or pressure in a sealed cavity. Typically, the cavity structure adopts a large wall thickness to ensure structural rigidity, but it also limits the motion range for soft robots. Soft deformation actuators driven by shape memory alloys and shape memory polymers generally use electrical or thermal stimulation to realize the preset movement, but it has some defects such as poor controllability and delayed response. Most of the above actuators have a single motion mode, and thus it is difficult for a single module to possess multiple motion capabilities at the same time.

In view of the defects and limitations of the above-mentioned software actuator, the present disclosure combines the origami structure and soft robot technology to propose a hybrid drive omni-directional motion actuator based on an origami structure.

SUMMARY

The present disclosure provides a hybrid drive omni-directional motion actuator based on an origami structure, which has the advantages such as rich motion modes, good flexibility, high folding ratio, and light weight.

The technical solution adopted by the present disclosure is as follows:

The hybrid drive omni-directional motion actuator based on the origami structure includes at least one actuating module, wherein the at least one actuating module comprises a deformable columnar shell based on the origami structure, an upper cover plate and a lower cover plate; the columnar shell is the origami structure derived from a Waterbomb crease, and a cavity for accommodating gas is formed inside the columnar shell; openings are formed at two ends of the cavity, and the openings are connected to the upper cover plate and the lower cover plate for blocking the openings, respectively; the lower cover plate is provided with a vent hole communicating with the cavity, and the upper cover plate and the lower cover plate are pulled by cross-arranged driving ropes; and the columnar shell is capable of deforming by contraction, bending and torsion through a cooperation of pneumatic and tendon drive, so that a single actuating module has omni-directional motion capability.

Further, the columnar shell of the origami structure is a columnar structure of skin inner core-skin laminating, with both an open top and an open bottom, the inner core comprises four side surfaces, each of the side surfaces consists of: crease surfaces; and upper and lower joint surfaces connected to the upper cover plate and the lower cover plate, respectively;
  each of the side surfaces comprises panels repeatedly bendable materials for simulating creases; the crease surfaces are separated from the upper and lower joint surfaces by a horizontal peak crease, each of the crease surfaces comprises two diagonal creases and one horizontal crease, and the crease surfaces are classified as four crease surfaces A, B, C and D based on different positions;
  when the two crease surfaces A and C are in an initial state, a diagonal crease and a horizontal crease intersect at a center of the crease surfaces and interrupt each other, to form two horizontal peak creases and four diagonal valley creases, and the crease surfaces comprise six triangular panels; and
  when the adjacent crease surfaces of the two crease surfaces B and D are in the initial state, the two diagonal creases in the crease surfaces are not activated and do not play a role; the horizontal crease is not interrupted, a horizontal valley crease is formed, the triangular panels on both sides of the valley crease are merged, and the crease surfaces comprises two rectangular panels.

Further, the upper and lower joint surfaces of the deformable columnar shell based on the origami structure are contacted to and fixed to an inner skirt side surface of the upper cover plate and an inner skirt side surface of the lower cover plate, respectively.

Further, four round holes are uniformly provided at four corners of the upper cover plate for fixing the driving ropes, one side surface of the upper cover plate is provided with two mortise and tenon structure male heads configured to connect multiple actuating modules or combine with other motion actuators, and the other side surface of the upper cover plate is provided with a seam-allowance-type double-layer skirt structure, an inner skirt of the double-layer skirt structure is higher than an outer skirt of the double-layer skirt structure, and grooves between the inner skirt and the outer skirt are configured to accommodate the columnar shell.

Further, four round holes are uniformly provided at four corners of the lower cover plate to be threaded by the driving ropes; one side surface of the lower cover plate is provided with four motor seats, one vent hole and two mortise and tenon structure female heads; the motor seats are configured to fix driving motors, the vent hole is configured for input and output of gas, and the mortise and tenon structure female heads are configured to connect multiple actuating modules or combining with other motion actuators; and the other side surface of the lower cover plate is provided with a double-layer skirt structure an inner skirt of the double-layer skirt structure is higher than an outer skirt of the double-layer skirt structure, and grooves between the inner skirt and the outer skirt are configured to accommodate the columnar shell.

Further, the driving motors are fixed at the motor seats of the lower cover plate, output shafts of the driving motors are connected to reels, and the reels are responsible for receiving the driving ropes passing through the round holes at the four corners of the lower cover plate; the driving ropes are arranged as crosswise, with one end fixed to the reels and the other end fixed to the round holes at the four corners of the upper cover plate; and the vent hole of the lower cover plate is connected to an air pipe for air intake, and the air pipe is received in a bunch wire slot of the lower cover plate together with power cords of the driving motors.

Further, a gap is formed between an outer side of the columnar shell and an inner surface of the outer skirt, and the gap is filled with sealant to seal the columnar shell and the lower cover plate.

Further, an upper surface of the lower cover plate is provided with a cylindrical boss, and the cylindrical boss is hollow and serves as an extension of the vent hole.

Compared to the prior art, the beneficial technical effects of the present disclosure are as follows:

The deformation and mode of the shell can be adjusted according to requirements, so that the actuator can realize omni-directional movement of expansion, contraction, bending and torsion, with a variety of motion modes; the number of modules of the actuator is adjustable, allowing for rapid assembly and reconstruction of the actuator; the use of the hybrid driving mode, combining tendon driving and pneumatic driving, creates an antagonistic effect, enriching the deformation state of the actuator with a low cost.

BRIEF DESCRIPTION OF DRAWINGS

The present disclosure will be further explained with reference to the attached drawings and examples.

Reference signs: 1—Shell; 2—First driving rope; 3—Second driving rope; 4—Lower cover plate; 5—Third driving rope; 6—Fourth driving rope; 7—Upper cover plate; 8—First driving motor; 9—Second driving motor; 10—Third driving motor; 11—Fourth driving motor; 12—First reel; 13—Second reel; 14—Third reel; 15—Fourth reel; 16—origami unit.

DESCRIPTION OF EMBODIMENTS

The specific embodiments of the present disclosure will be described in further detail with reference to the drawings. The following examples or drawings are intended to illustrate the present disclosure, rather than to limit the scope of the present disclosure.

As shown in FIG. 1-FIG. 4, an embodiment of the present disclosure provides a hybrid drive omni-directional motion actuator based on the origami structure, which includes at least one actuating module. The at least one actuating module includes a deformable shell 1 based on the origami structure, an upper cover plate 7 and a lower cover plate 4. The shell forms a cavity for accommodating gas, and the two ends of the cavity are open. The upper end is connected to the upper cover plate 7 for blocking, and the lower end is connected to the lower cover plate 4 for blocking. The lower cover plate 4 is provided with a vent hole communicating with the cavity, and the upper cover plate 7 and the lower cover plate 4 are pulled by cross-arranged driving ropes. Through the cooperation of pneumatic and tendon drives, the actuating module can realize the switching of various deformation modes.

The columnar shell 1 is a columnar structure in which skin-origami structure inner core-skin are laminated. The skin refers to a deformable film produced by a series of materials such as TPU (thermoplastic polyurethane rubber), kapton (polyimide) and silica gel. The origami structure inner core includes four sides, which are composed of several panels, and the panels are made of reusable materials for simulating creases. In an example, each side surface includes a crease surface and a joint surface where the upper and lower cover plates are connected. The crease surface and the upper-and-lower joint surface are separated by a horizontal peak crease, and the crease surface consists of two diagonal creases and one horizontal crease. Depending on different positions, the crease surfaces can be divided into A, B, C and D crease surfaces.

When the crease surfaces A and C are in an initial state, a diagonal crease and a horizontal crease intersect at the center of the crease surfaces and interrupt each other, forming two horizontal peak creases and four diagonal valley creases. At this time, the crease surfaces consist of six triangular panels.

Figure 1:
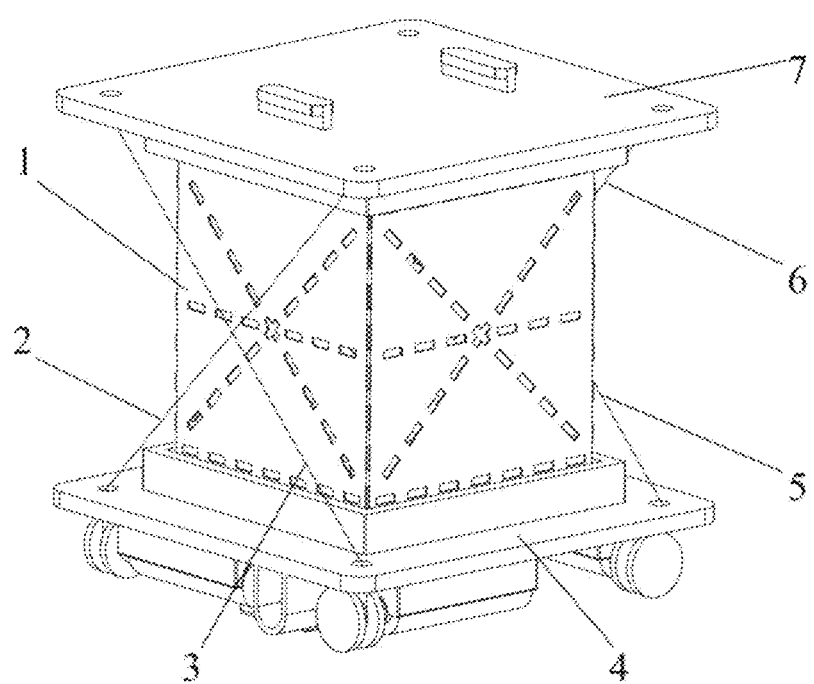
FIG. 1 is a schematic structural diagram of an actuating module according to the present disclosure.
Figure 2:
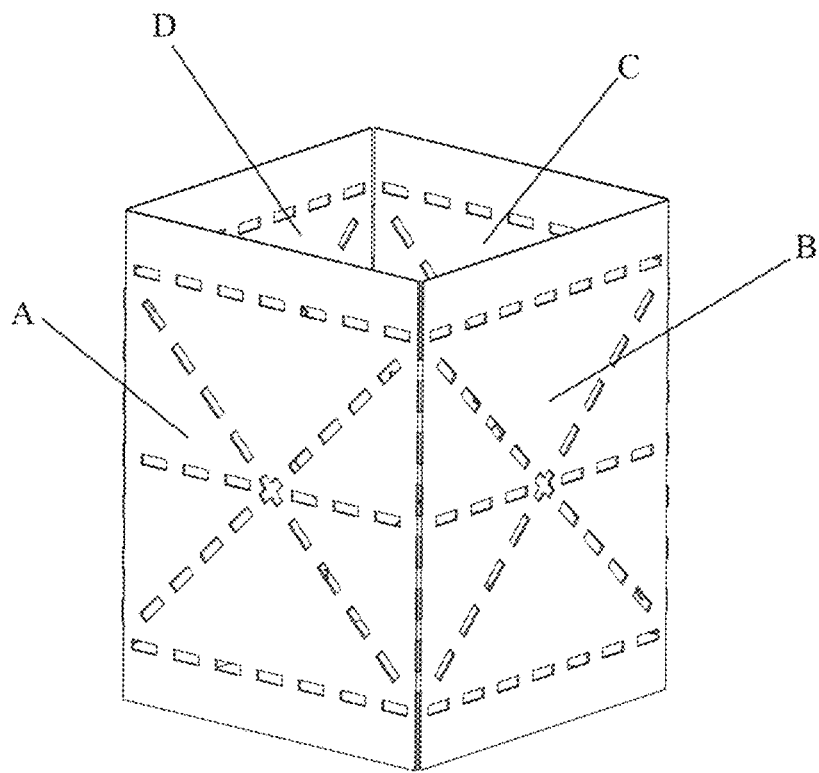
FIG. 2 is a schematic structural diagram of a columnar shell according to the present disclosure the present disclosure.
Figure 3:
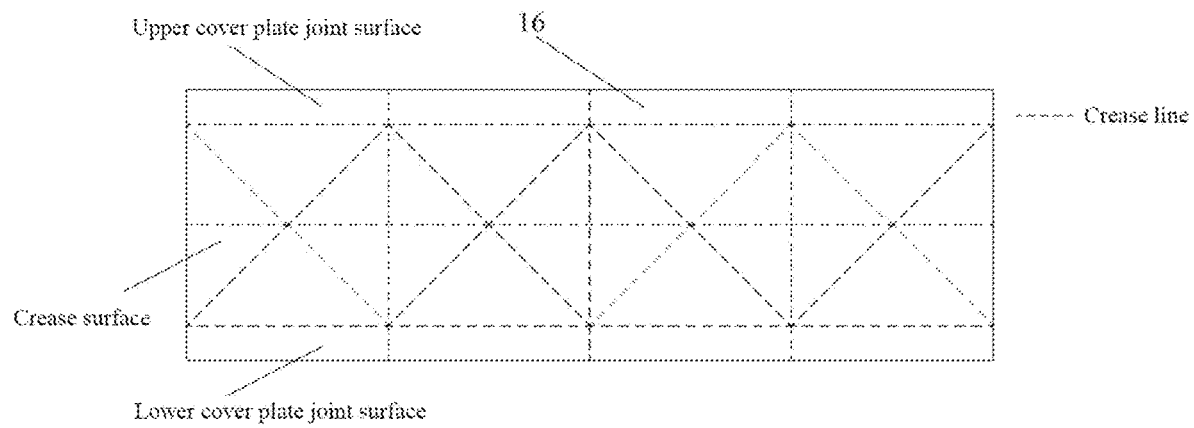
FIG. 3 is a schematic view of the crease of an origami unit according to the present disclosure the present disclosure.
Figure 4:
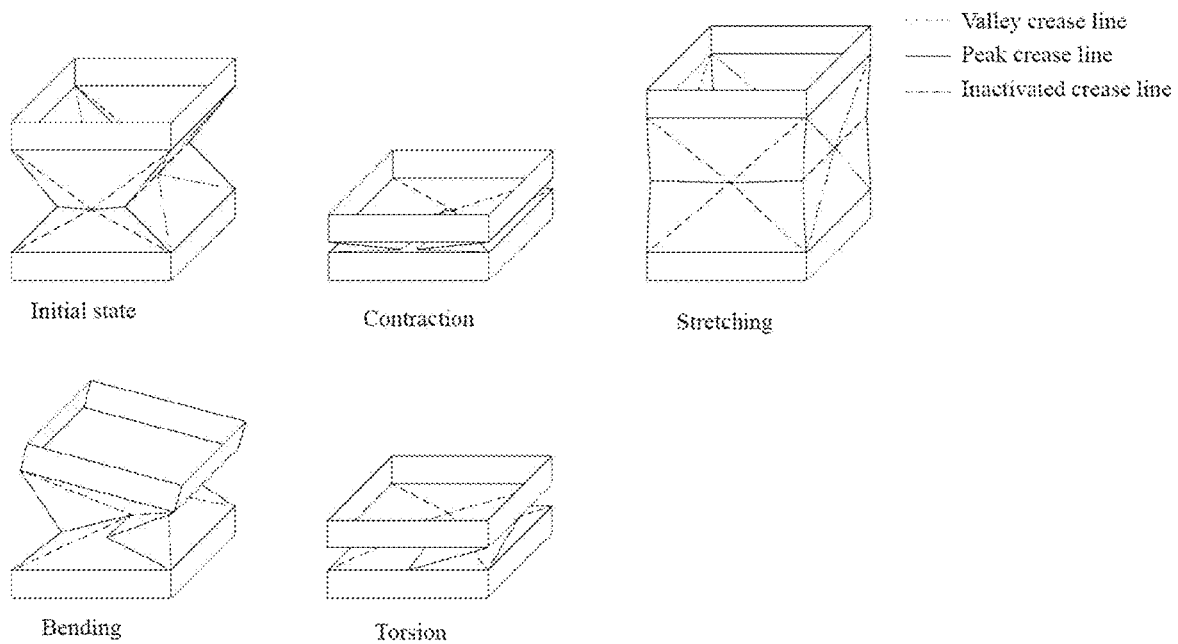
FIG. 4 is a schematic movement diagram of the origami unit according to the present disclosure the present disclosure.

When the B and D crease surfaces are in the initial state, the two diagonal creases in the crease surfaces are not activated, and the horizontal crease is not interrupted, forming a horizontal valley crease, and the triangular panels on both sides of the valley crease are merged, at which time, the crease surface consists of two rectangular panels. The origami structure can realize the expansion, bending and torsion movement as shown in FIG. 4. Being not inactivated means that the two diagonal creases do not work (equivalent to none), and six triangles in six different planes originally produced by folding the creases are merged, and every three triangles are merged in one plane (see the rightmost surface in the initial state of FIG. 4).

Figure 5:
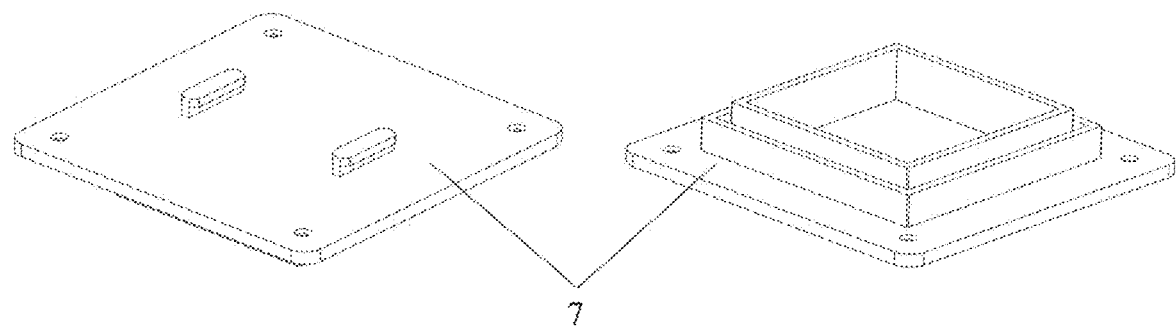
FIG. 5 is a schematic structural diagram of an upper cover plate according to the present disclosure the present disclosure.

As shown in FIG. 5, the upper cover plate 7 is made of a hard material, and four round holes are evenly distributed at the four corners for fixing the driving ropes for traction. The upper surface of the upper cover plate 7 is provided with two mortise and tenon structure male heads to realize the connection of multiple actuating modules or the combination with other motion actuators. The lower surface of the upper cover plate 7 is provided with a seam-allowance-type double-layer skirt structure, with the inner skirt being higher than the outer skirt, and there are grooves between the skirts. During connection, the upper joint surface on the inner side of the shell 1 is bonded to the outer surface of the inner skirt of the upper cover plate 7. There is a gap between the outer side of the shell 1 and the inner surface of the outer skirt, and the gap is filled with sealant to seal the shell 1 and the upper cover plate 7.

Figure 6:
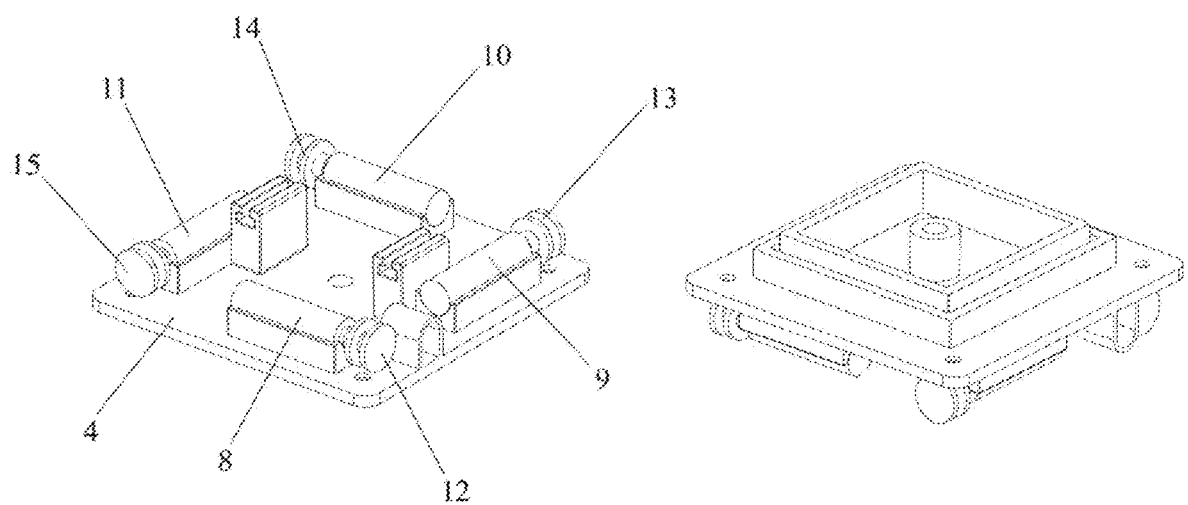
FIG. 6 is a structural schematic diagram of a lower cover plate assembly according to the present disclosure the present disclosure.

As shown in FIG. 6, the lower cover plate 4 is made of a hard material, and the upper surface of the lower cover plate 4 is provided with the same seam-allowance-type double-layer skirt structure as that of the upper cover plate 7. When connecting, the lower joint surface of the inner side of the shell 1 is bonded with the outer surface of the inner skirt of the lower cover plate 4. There is a gap between the outer side of the shell 1 and the inner surface of the outer skirt, and the gap is filled with sealant to seal the shell 1 and the lower cover plate 4. The upper surface of the lower cover plate 4 is provided with a cylindrical boss, which is hollow and serves as an extension of the vent hole. The upper cover plate 7 and the lower cover plate 4 are both made of hard materials, including but not limited to hard plastics and hard metals.

The lower surface of the lower cover plate 4 is provided with two mortise and tenon structure female heads, one vent hole, four motor seats and a bunch wire slot. The tenon-mortise structure female head can realize the connection of multiple actuating modules or the combination with other motion actuators. The vent hole is directly connected with an air pipe, so that gas can be input and sucked out of the closed cavity formed by the shell 1, the upper cover plate 7 and the lower cover plate 4. The four motor seats are respectively used for fixing the first driving motor 8, the second driving motor 9, the third driving motor 10 and the fourth driving motor 11. The first driving motor 8 is directly connected with the first reel 12 to control the tightening and loosening of the first driving rope 2 fixed on the first reel 12. The second driving motor 9 is directly connected with the second reel 13 to control the tightening and loosening of the second driving rope 3 fixed on the second reel 13. The third driving motor 10 is directly connected with the third reel 14 to control the tightening and loosening of the third driving rope 5 fixed on the third reel 14. The fourth driving motor 11 is directly connected with the fourth reel 15 to control the tightening and loosening of the fourth driving rope 6 fixed on the fourth reel 15. The power lines and air pipes of the four driving motors are accommodated in the bunch wire slot together. Four round holes are evenly arranged at the four corners of the lower cover plate 4, which are located directly below the four reels, so that the other end of the driving rope can pass through the lower cover plate 4 and be fixed on the round holes evenly arranged at the four corners of the upper cover plate 7.

By tightening or loosening different driving ropes and inflating the cavity formed by the shell, a single actuating module can realize telescopic movement, omni-directional bending movement and bidirectional torsion movement.

The driving mode of the actuating module and the corresponding deformation mode are given in Table 1.

| Action | Pneumatic drive | Tendon drive |
| --- | --- | --- |
| Telescoping | Positive/negative pressure | |
| Anterior bending | Positive pressure | First driving rope 2: tightened; Second driving rope 3: tightened Third driving rope 5: loosen; Fourth driving rope 6: loosen |
| Posterior bending | Positive pressure | First driving rope 2: loosen; Second driving rope 3: loosen The third driving rope 5: tightened; Fourth driving rope 6: tightened |
| Left bending | Positive pressure | The first driving rope 2 is tightened; Second driving rope 3: loosen The third driving rope 5: loosen; Fourth driving rope 6: tightened |
| Right bending | Positive pressure | First driving rope 2: loosen; Second driving rope 3: tightened The third driving rope 5: tightened; Fourth driving rope 6: loosen |
| Clockwise torsion | | The first driving rope 2 is tightened; Second driving rope 3: loosen The third driving rope 5: tightened; Fourth driving rope 6: loosen |
| Counter-clockwise torsion | | First driving rope 2: loosen; Second driving rope 3: tightened The third driving rope 5: loosen; Fourth driving rope 6: tightened |

Figure 7:
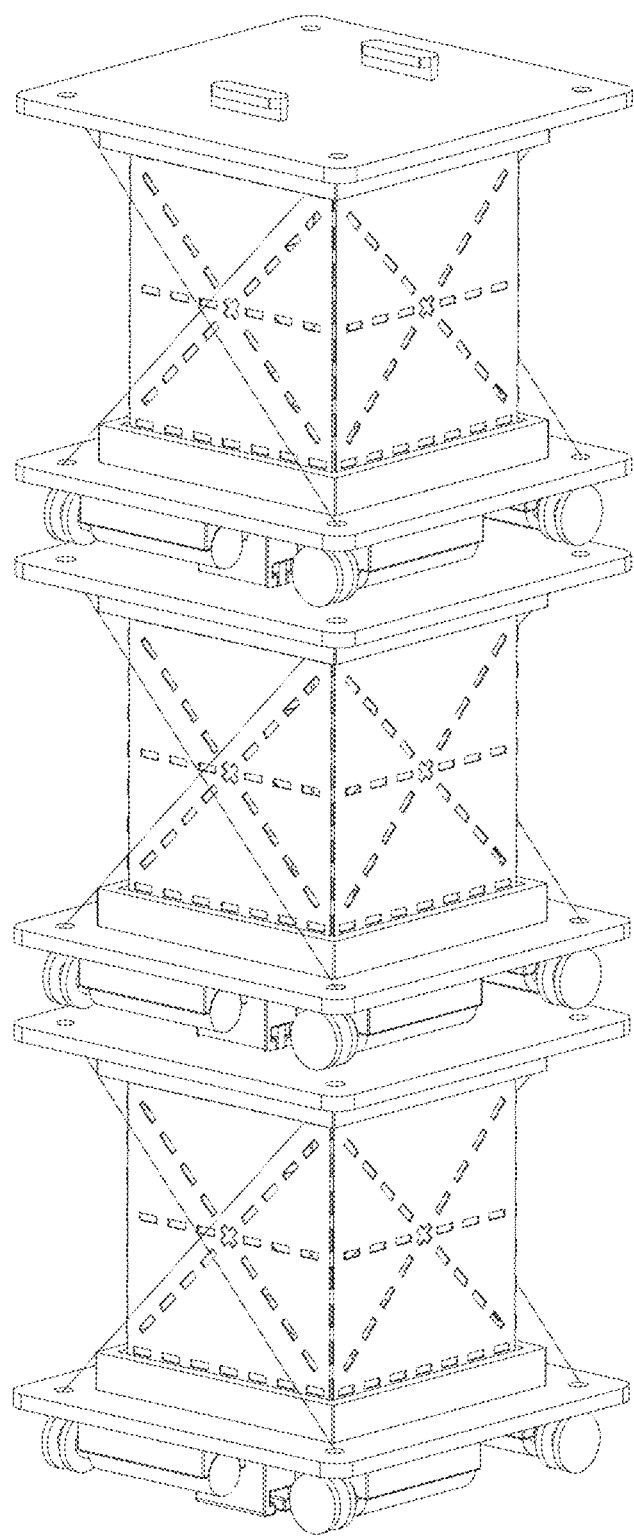
FIG. 7 is a schematic structural view of a driver including a plurality of actuating modules according to the present disclosure.

As shown in FIG. 7, the embodiment of the present disclosure also discloses a combined actuating unit. By combining a plurality of actuating modules in the above embodiments, more abundant telescopic, bending and torsional motion modes can be realized. For example, the upper cover plate 7 of an upper actuating module can be equipped with end effectors such as grippers, suction cups and the like through the tenon-mortise structure male head, and the lower cover plate 4 of a bottom actuating module can be fixed on the base through a tenon-mortise structure female head, thus forming a simple flexible mechanical arm.

The above embodiments are only intended to illustrate, rather than to limit the technical solution of the present disclosure. Although the present disclosure has been described in detail with reference to the foregoing embodiments, it should be appreciated by those skilled in the art that the technical solution described in the foregoing embodiments can still be modified, or some or all of the technical features thereof can be replaced by equivalents. However, these modifications or substitutions do not make the essence of the corresponding technical solution deviate from the scope of the technical solution of the embodiments of the present disclosure.

What is claimed is:

1. A hybrid drive omni-directional motion actuator based on an origami structure, comprising at least one actuating module, wherein the at least one actuating module comprises:
  a deformable columnar shell based on the origami structure, an upper cover plate and a lower cover plate; the columnar shell is the origami structure derived from a Waterbomb crease, and a cavity for accommodating gas is formed inside the columnar shell; openings are formed at two ends of the cavity, and the openings are connected to the upper cover plate and the lower cover plate for blocking the openings, respectively; the lower cover plate is provided with a vent hole communicating with the cavity, and the upper cover plate and the lower cover plate are pulled by cross-arranged driving ropes; and the columnar shell is capable of deforming by contraction, bending and torsion through a cooperation of pneumatic and tendon drive, so that a single actuating module has omni-directional motion capability;
  wherein the columnar shell of the origami structure is a columnar structure of skin-inner core-skin laminating, with both an open top and an open bottom, the inner core comprises four side surfaces,
  wherein each of the side surfaces consists of: crease surfaces; and upper and lower joint surfaces connected to the upper cover plate and the lower cover plate, respectively;

wherein each of the side surfaces comprises panels repeatedly bendable materials for simulating creases; the crease surfaces are separated from the upper and lower joint surfaces by a horizontal peak crease, four crease surfaces (A), (B), (C) and (D) are formed based on different positions, and each of the four crease surfaces comprises two diagonal creases and one horizontal crease;

when two crease surfaces (A) and (C) are in an initial state, a diagonal crease and a horizontal crease intersect at a center of the crease surfaces and interrupt each other, to form two horizontal peak creases and four diagonal valley creases, and the crease surfaces comprise six triangular panels; and when adjacent crease surfaces of two crease surfaces (B) and (D) are in the initial state, the two diagonal creases in the crease surfaces are not activated and do not play a role; the horizontal crease is not interrupted, a horizontal valley crease is formed, the triangular panels on both sides of the valley crease are merged, and the crease surfaces comprises two rectangular panels; and wherein the upper and lower joint surfaces of the columnar shell based on the origami structure are contacted to and fixed to an inner skirt side surface of the upper cover plate and an inner skirt side surface of the lower cover plate, respectively.

\* \* \* \* \*